United States Patent [19]

Mammano et al.

[11] Patent Number: 5,521,528

[45] Date of Patent: * May 28, 1996

[54] CONTROLLABLE BUS TERMINATOR

[75] Inventors: Robert A. Mammano, Costa Mesa, Calif.; Mark Jordan, Manchester, N.H.

[73] Assignee: Unitrode Corporation, Billerica, Mass.

[*] Notice: The portion of the term of this patent subsequent to Dec. 21, 2010, has been disclaimed.

[21] Appl. No.: 273,376

[22] Filed: Jul. 11, 1994

Related U.S. Application Data

[63] Continuation of Ser. No. 888,911, Jul. 7, 1993, Pat. No. 5,338,979, which is a continuation of Ser. No. 990,133, Dec. 14, 1992, which is a continuation of Ser. No. 755,072, Sep. 5, 1991, Pat. No. 5,272,396.

[51] Int. Cl.[6] .......................... H03K 17/16; H03K 3/01
[52] U.S. Cl. .............................. 326/30; 327/321
[58] Field of Search ...................... 307/443, 147, 307/296.1, 296.2, 241, 243; 333/24 R, 33; 326/30, 90; 327/403, 405, 321, 315, 318, 320

[56] References Cited

U.S. PATENT DOCUMENTS

| | | | |
|---|---|---|---|
| Re. 33,378 | 10/1990 | Mehl | 307/243 |
| 3,135,874 | 6/1964 | Lucas et al. | 307/243 |
| 3,155,963 | 11/1964 | Boensel | 307/243 |
| 4,015,147 | 3/1977 | Davidson et al. | 307/304 |
| 4,220,876 | 9/1980 | Ray | 307/296.4 |
| 4,565,959 | 1/1986 | Nagano | 307/296.6 |
| 4,675,551 | 6/1987 | Stevenson et al. | 307/443 |
| 4,748,426 | 5/1988 | Stewart | 326/30 |
| 4,821,170 | 4/1989 | Bernick et al. | 364/200 |
| 4,831,283 | 5/1989 | Newton | 307/443 |
| 4,859,877 | 8/1989 | Cooperman et al. | 307/443 |
| 4,864,291 | 9/1989 | Korpi | 340/825.5 |
| 4,920,339 | 4/1990 | Friend et al. | 326/30 |
| 4,965,801 | 10/1990 | DuLac | 371/40.1 |
| 4,988,890 | 1/1991 | Narhi et al. | 307/147 |
| 5,020,284 | 7/1991 | Feldbaumer et al. | 326/30 |
| 5,029,284 | 7/1991 | Feldbaumer et al. | 307/443 |
| 5,272,396 | 12/1993 | Mammano et al. | 307/443 |
| 5,338,979 | 8/1994 | Mammano et al. | 307/443 |

OTHER PUBLICATIONS

"Push SCSI Performance to the Limit", Paul Boulay, Kurt Chan, and James E. Schuessler, Electronic Design, May 10, 1990, pp. 85–88 and 90–92.

"Linear Technology Corporation Linear Databook 1990", Linear Technology Corporation, 1989, pp. 2, 4–9, 4–15, 4–17, 4–28, 4–29, 4–45, 4–57, 4–69, 4–89, 4–99, 4–100, 4–113, 4–122, 4–124, 4–125.

"Linear Technology Corporation Linear Databook Supplement 1988", Linear Technology Corporation, 1987, cover p. and pp. S10–23 and S10–24.

"Linear Technology LT1086/LT1086–5/LT1086–12", Linear Technology Corporation, 1988, pp. 1–12.

(List continued on next page.)

*Primary Examiner*—Edward P. Westin
*Assistant Examiner*—Richard Roseen
*Attorney, Agent, or Firm*—Weingarten, Schurgin, Gagnebin & Hayes

[57] ABSTRACT

A controllable bus terminator for providing a switchable termination on a bus having a plurality of conductors, wherein the controllable bus terminator includes a voltage regulator, a plurality of termination networks, each having a first terminal and a second terminal wherein the second terminal of each of the termination networks provides an output terminal of the bus terminator. The bus terminator further includes a plurality of electrically controllable switches, each of the switches having a first port coupled to the voltage regulator and a second port coupled to the first terminal of a corresponding one of the termination networks wherein each of the switches couples the corresponding termination network to the voltage regulator when the corresponding switch is in a first state and wherein each of the switches disconnects the corresponding termination network from the voltage regulator when the corresponding switch is in a second state.

13 Claims, 3 Drawing Sheets

OTHER PUBLICATIONS

"The New IEEE Standard Dictionary of Electrical and Electronics Terms", Institute of Electrical and Electronics Engineers, 5th Edition, 1993, two cover sheets and p. 1471.

"McGraw–Hill Dictionary of Scientific and Technical Terms", McGraw–Hill Book Company, 1974, two cover sheets and p. 1582.

"Van Nostrand's Scientific Encyclopedia", D. Van Nostrand Company, Inc., 4th Edition, 1968, two cover sheets and p. 1951.

CONTROLLABLE BUS TERMINATOR

RELATED APPLICATION

This application is a continuation of application Ser. No. 08/088,911, filed Jul. 7, 1993, now U.S. Pat. No. 5,338,979, which is a continuation of application Ser. No. 07/990,133, filed Dec. 14, 1992, which is a continuation of application Ser. No. 07/755,072, filed Sep. 5, 1991, now issued as U.S. Pat. No. 5,272,396 entitled: CONTROLLABLE BUS TERMINATOR WITH VOLTAGE REGULATION

FIELD OF THE INVENTION

The invention relates to the field of computer buses and specifically to the field of controllable terminators for computer buses.

BACKGROUND OF THE INVENTION

In a computer system, the processor, the memory, and the input/output (I/O) devices communicate with one another by way of a bus. A bus is a series of conductors, each of which is capable of transmitting signals which represent either data to be transferred between devices on the bus or control information, such as device addresses, which determine when and to where the data being transferred by the bus is to be transferred. The signals transferred on the bus typically take the form of rapidly changing bi-stable voltage levels. These voltage levels are placed on the conductors by bus drivers incorporated into each device which communicates with the bus. For optimum signal power transfer between devices and minimum signal reflection, the bus must be terminated in such a way that the impedance of the bus matches the impedance of the bus drivers. The bus impedance should be held approximately constant.

Generally, bus terminators take the form of modular devices. The bus terminator is physically inserted onto the bus to provide termination and physically removed from the bus to remove termination, for example, when the bus is to be extended. Such changing of the bus termination requires physical access to the bus, which in turn requires the opening of the enclosures protecting the devices and bus.

The present invention permits a bus terminator to be connected to and disconnected from a bus electrically and without being physically moved.

Another feature of the invention is that when the terminator is disconnected from the bus, its internal power supply is reduced substantially.

SUMMARY OF THE INVENTION

The invention relates to a controllable terminator for a computer bus which is capable of being electrically connected to and disconnected from the bus by means of a control signal.

The terminator includes a voltage regulator portion, a control portion and a series of bus terminating resistors, each of which is connected through a transistor switch for connecting each of the resistors to the regulated voltage. The voltage regulator portion includes a power-down circuit to turn the voltage regulator portion off, using the same control signal which disconnects the terminating resistors.

The control portion uses a single external signal voltage level both to cause the series of bus terminating transistor switches to switch and to cause the voltage regulator portion to turn on and off for reduced power consumption. In one embodiment, the control portion includes a comparator to determine the voltage level at which switching is to take place.

BRIEF DESCRIPTION OF THE DRAWING

These and other features and advantages of the invention will be more readily understood in view of the accompanying specification and drawings in which.

DESCRIPTION OF THE PREFERRED EMBODIMENT

Figure 1:
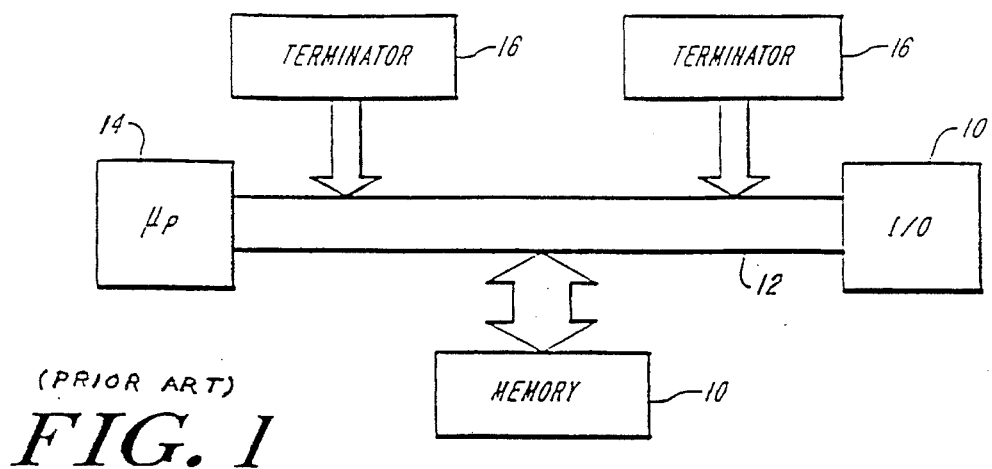
FIG. 1 is a diagram of a computer system utilizing a bus terminator known to the prior art.

Referring to FIG. 1, a computer system 10 includes a series of devices 10 each communicating with a processor 14 and one another over a bus 12. Each end of the bus 12 terminates at a terminator 16.

Figure 2:
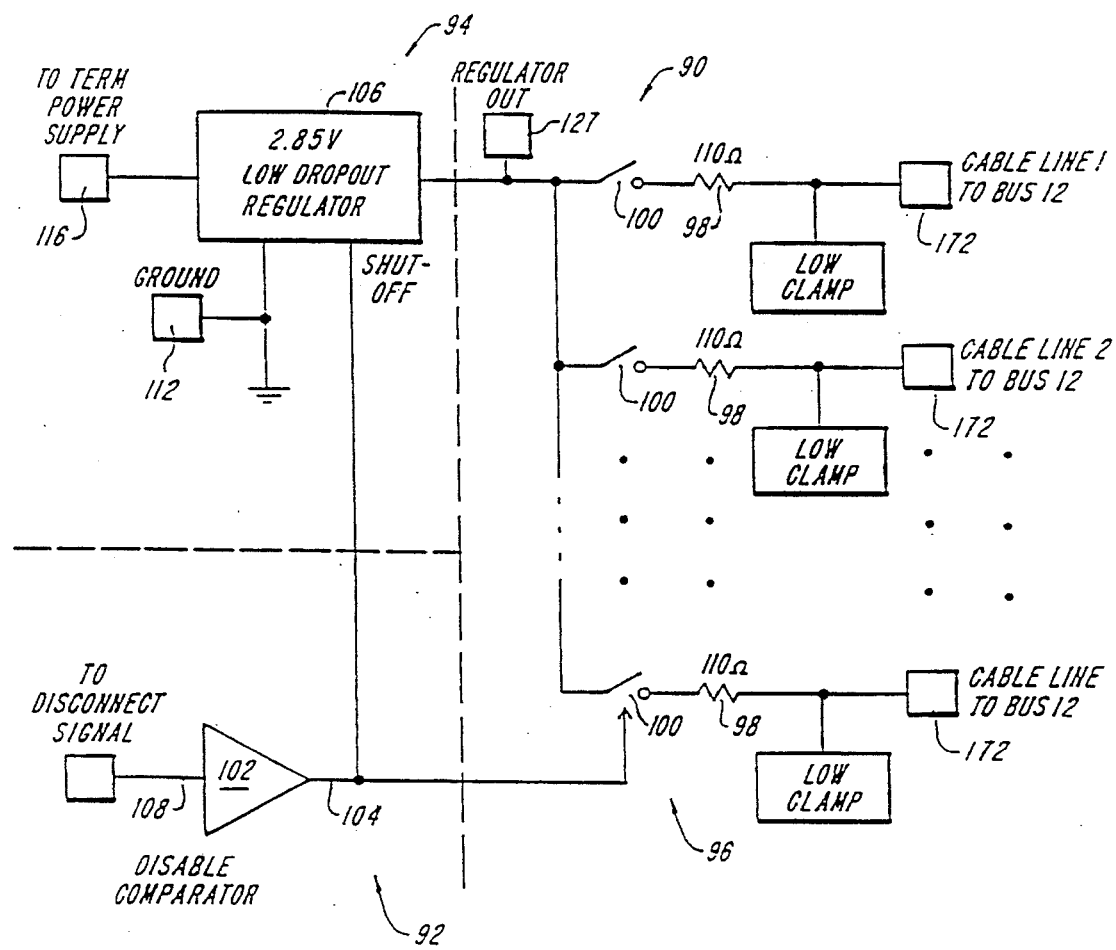
FIG. 2 is a block diagram of an embodiment of the invention.

Referring now to FIG. 2, in brief overview, an embodiment of the controllable terminator 90 of the invention can be roughly separated into a control portion 92, a voltage regulator portion 94 and a switching portion 96. The control portion 92 controls the connection of the bus 12, through a series of resistors 98, to the voltage regulation portion 94 by means of a series of switches 100 connected between the resistors 98 and the voltage regulation portion 94. In the embodiment shown, the control portion 92 includes a disconnect comparator 102 which produces a control voltage on its output terminal 104 in response to a disconnect control signal applied to one of its input terminals 106. When the disconnect control signal is high, the output signal of the comparator 102 opens the series of switches 100 and turns off the voltage regulator 106 of the voltage regulator portion 94. When the disconnect control signal is low, the voltage regulator portion 94 is activated and the switches 100 are closed, connecting the bus 12 to the voltage regulation portion 94 through the resistors 98. Thus the disconnect control signal permits the controllable terminator 90 to be connected or removed electrically from the bus 12 and the power supply 116, without being physically removed from the system.

Figure 3:
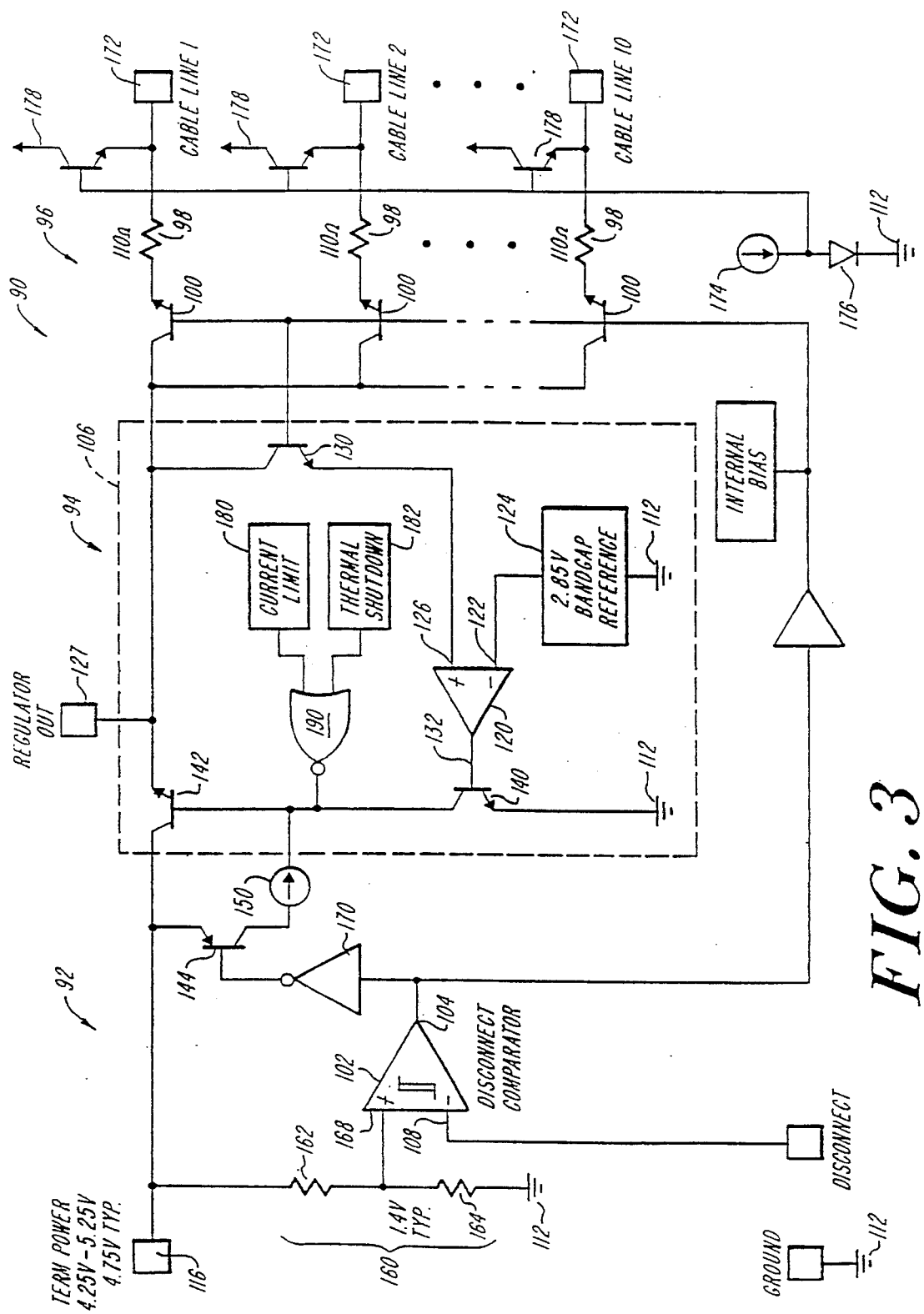
FIG. 3 is a schematic diagram of an embodiment of the invention shown in FIG. 2.

Referring now also to FIG. 3, the voltage regulator portion 94 includes a voltage differential amplifier 120 which has a first input terminal 122 connected to a bandgap reference 124. In the embodiment shown the bandgap reference 124 is set to 2.85 V, but other voltage references may be used to produce other voltage levels. A second input terminal 126 of the differential amplifier 120 is connected to the regulator output 127 through the transistor switch 130. Differential amplifier 120 works with transistor 140 and switchable current source 150 in order to control the conduction of power transistor 142 and thereby hold the regulator's output voltage constant in a manner well known in the art. Current source 150, which provides the bias current to power transistor 142 is connected to the power supply terminal 116 through transistor switch 144.

When transistor 144 is on, the current supply 150 provides bias current to the power transistor 142, subject to the degree of control provided by differential amplifier 120 and transistor 140. Conversely, when transistor 144 is off, the base current of transistor 142 is interrupted turning it off and causing both the regulator's output voltage to fall to zero volts and the internal power consumption to drop to substantially zero. The turning on and off of transistor 144 is controlled by the control portion 92 of the terminator 90 and will be discussed in more detail below.

The switching portion 96 of the terminator 90 includes a series of terminating resistors 98, each associated with a bus line 172 and the series of switching transistors 100, each associated with a respective resistor 98. A high control voltage applied to the base of each transistor 100 causes each to conduct, connecting its respective bus line 172 to the voltage regulator portion 94 through the resistors 98. Conversely, a low control voltage turns off each transistor 100, electrically disconnecting each bus line 172 from the voltage regulator and causing each bus connection 172 to appear as a high impedance to the bus 12.

The control portion 92 includes a voltage divider 160 which includes two resistors 162,164 connected between the power supply 116 and ground 112. The resistors 162,164 are selected so as to provide a defined voltage level to a first input terminal 168 of the disconnect comparator 102. In the embodiment shown, the power supply connected to terminal 116 is set for 4.75 V, the divider 160 establishes a threshold of 1.4 V at the first terminal 168 of the comparator 102. A voltage level applied to a second input terminal 108 of the comparator 102 is the disconnect control signal to connect or disconnect the terminator 90 from the bus 12.

In the embodiment shown, when the voltage of the disconnect signal at the second input terminal 106 of the disconnect comparator 102 is below 1.4 V, the signal on the output terminal 104 of the disconnect comparator 102 goes high. This signal is inverted by invertor 170 and applied to the base of transistor 144, turning it on. This permits current from the current source 150 to be applied to the base of power transistor 142 turning it on and permitting the feedback loop consisting of transistors 140,142 and differential amplifier 120 to regulate the voltage level. At the same time, the high signal on the output terminal 104 of disconnect comparator 102 is applied to the base of transistors 100 and 130, turning them on. The purpose of transistor 130 is to provide a voltage offset in the regulator feedback loop matching the voltage drop across each conducting transistor 100. The offset allows the regulator to hold the voltage of all terminating resistors 98 exactly equal to the regulator's reference voltage, with any variable voltage drop across transistor switches 100 cancelled by the voltage drop across transistor 130.

Conversely, when the signal voltage on the second input 108 of the disconnect comparator 102 goes above the voltage level on the first input 170, the output signal on the output terminal 104 of the disconnect comparator 102 goes low. This low signal is inverted to high by invertor 170 causing transistor 144 to shut off the voltage regulation portion 92 of the controllable terminator 90.

At the same time, the low output signal of the disconnect comparator 102 shuts off transistor 130 breaking the feedback loop to the comparator 102 from the power supply 116. The same signal which controls the voltage regulator portion 94 is also applied to the base of each transistor 100 causing each of the transistors 100 to turn off, electrically disconnecting each of the bus lines 172 from the terminator 90.

Additionally, each bus line 172 includes a voltage clamp which includes a transistor 178 and current source 174 connected through a diode 176 to ground 112. The base of clamp transistor 178 is connected between the current source 174 and diode 176, while the emitter of the transistor 178 is connected to the bus line 172. If the signal on the bus line 172 undergoes ringing and attempts to become negative because of signal reflection, transistor 178 conducts, clamping the voltage on the bus line 172 at zero volts.

It should also be noted that sensors producing signals indicative of over current 180 and overheating 182 are also incorporated in the circuit and provide input signals to a NOR gate 190. If either of these signals are present, the output signal from the NOR gate 190 goes low shutting off transistor 142 and thereby shutting off power to the terminator 90.

Figure 4:
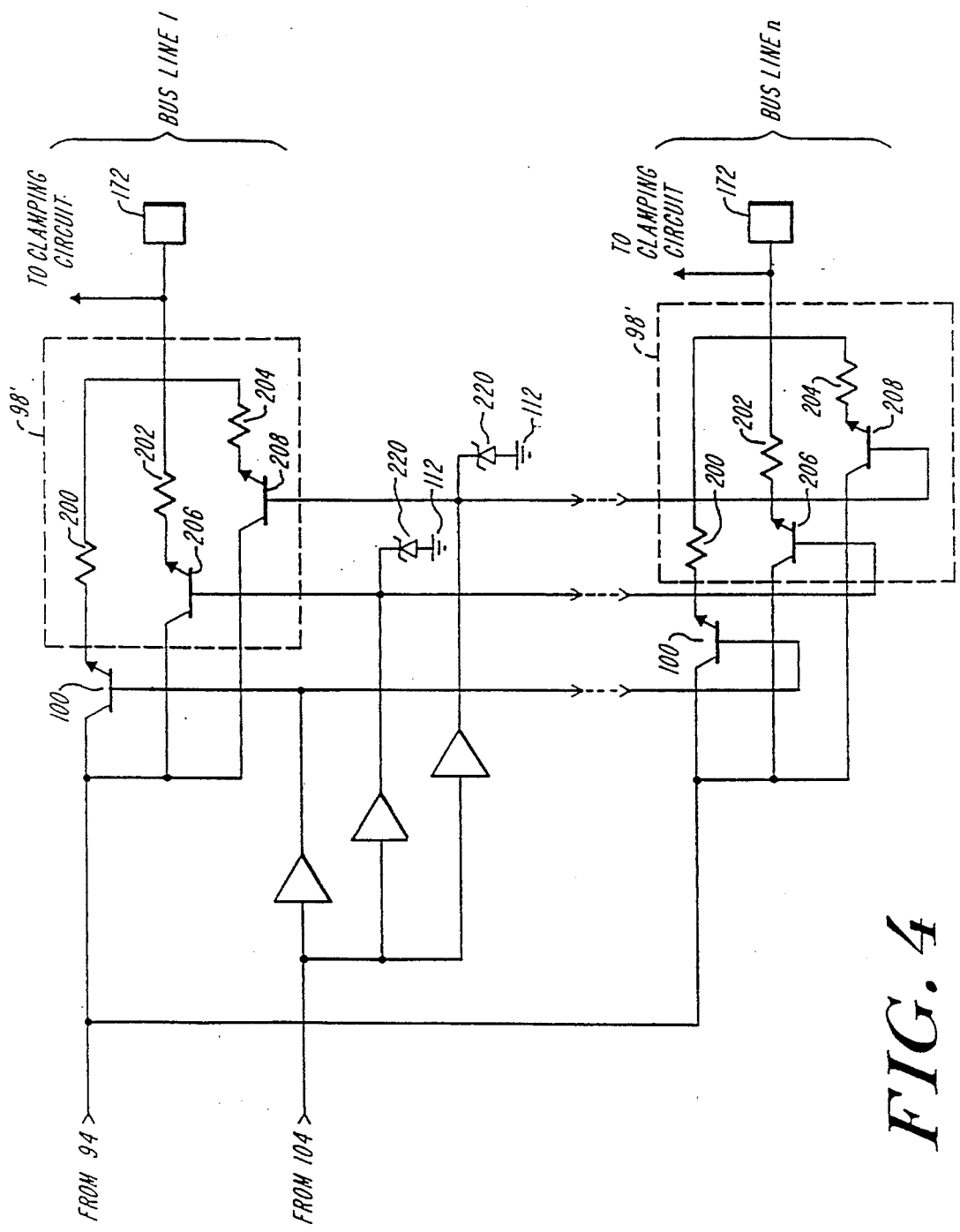
FIG. 4 is a schematic diagram of an embodiment of the switching portion of the embodiment of the invention shown in FIG. 3.

One embodiment of the controllable terminator 90 is constructed as a single chip integrated circuit having thin film resistors 98. In such an integrated circuit it is possible to trim the resistors 98 which would normally have a production tolerance of ±10% to within ±2.5% without increasing the control required in the manufacturing process. This is accomplished by the use of an additional circuit in the switching portion 96 of the controllable terminator 90. An embodiment of such a trimming circuit is shown in FIG. 4.

In this embodiment, each of the resistors 98 in the terminator 90 have been replaced by a transistor-resistor network 98'. In FIG. 4 only two transistor-resistor networks 98' have been shown for clarity, although each bus line 172 is connected to one. Each network 98' is constructed of three resistors 200,202,204 and two transistors 206,208. In the embodiment shown, the first resistor 200 has a nominal value of one hundred eighteen ohms while the second and third resistors 202,204 have nominal values of 1.15 k ohms and 2.3 k ohms, respectively. The transistors 206,208 are configured such that when the switching transistor 100 is turned on by the signal from the disconnect comparator output terminal 104, transistors 206,208 also turn on. This results in resistors 202 and 204 being connected in parallel with resistor 200, lowering the resistance experienced by the bus line 172.

A zener diode 220 is also connected between the base of each transistor 206,208 and ground 112. During fabrication, the resistance of the entire network 98' is determined and may be adjusted by pulsing a high current through one or both of the zener diodes 220, shorting them to ground 112. The result of the shorting of a zener diode 220 to ground 112 is that the base of its respective transistor 206 or 208 is also grounded, shutting off the transistor 206 or 208. The shutting off of transistor 206 removes resistor 202 from the network 98' thereby increasing the resistance of the network 98' Similarly, the shutting off of transistor 208 removes resistor 204 from the network 98' further increases the resistance of the network 98'. By selectively removing one or both of the zener diodes 220, the total network resistance may be adjusted to a close tolerance. Since each thin film resistor in a network 98' is well matched by its corresponding resistor in another network 98' on the same integrated circuit chip, only one measurement need be made on one network 98' to determine the total resistance of all networks 98' in the terminator 90.

Thus, the network 98' permits the adjustment of the total resistance experienced by the bus line 172.

In the network 98' the switching of the transistor 206 of the transistor-resistor network 98' connects and disconnects the resistor 202 from the parallel configuration. The switching of the transistor 206 is determined by the presence of the zener diode 220 connected between the base of the transistor 206 and ground. Thus, a method of adjusting the total resistance of the resistor network 98' circuit includes the steps of measuring the resistance of the network and selectively removing the zener diodes 220 in the networks 98'. The step of selectively removing the zener diodes 220 is here performed by the application of a breakdown current to the selected zener diode 220 to be removed.

Correspondingly, since all network resistors 200,202,204 are matched within a chip, the trimming of one resistor network to a specific resistance trims all resistor networks on that chip. Therefore only one zener diode 220 need be fabricated on the chip for each resistor 202,204, in the network 98', not one zener diode 220 for each resistor 202,204 for each network 98'. That is, in the embodiment shown, only two zener diodes 220 (one for resistors 202 and one for resistors 204) are fabricated on the chip, regardless of how many networks 98' are fabricated on the chip. Thus trimming one network 98' trims all networks 98' in the terminator 90 and no decrease in manufacturing tolerance is required for the thin film resistors 98 in order to assure that the specification of each terminator resistance is met. It is understood that other modifications or embodiments are possible which will still be within the scope of the appended claims. These and other examples of the concept of the invention illustrated above are intended by way of example and the actual scope of the invention is to be determined solely from the following claims.

We claim:

1. A method for terminating a plurality of conductors comprising the steps of:

providing a regulated voltage with a voltage regulator receiving an input voltage, said regulated voltage being substantially invariant to fluctuations in said input voltage;

providing a plurality of termination networks, each one corresponding to one of said plurality of conductors and having an impedance associated therewith;

coupling said regulated voltage to said plurality of termination networks by closing a plurality of electrically controllable switches having first and second terminals coupled between said voltage regulator and a corresponding one of said plurality of termination networks in response to a first control signal coupled to a control terminal of each of said plurality of electrically controllable switches;

decoupling said regulated voltage from said plurality of termination networks by opening said plurality of electrically controllable switches in response to a second control signal coupled to said control terminal of each of said plurality of electrically controllable switches; and clamping the voltage on said plurality of conductors.

2. The method recited in claim 1 wherein each of said plurality of termination networks comprises a resistor.

3. The method recited in claim 1 further comprising the step of ceasing to provide said regulated voltage in response to said second control signal.

4. The method recited in claim 1 further comprising the step of adjusting said impedance associated with one of the plurality of termination networks.

5. A method for terminating a plurality of conductors comprising the steps of:

providing a regulated voltage with a voltage regulator receiving an input voltage, said regulated voltage being substantially invariant to fluctuations in said input voltage;

providing a plurality of electrically controllable switches, each of said switches having first and second terminals coupled in series with said regulated voltage and a corresponding one of said plurality of conductors and a control terminal, wherein each of said switches couples the corresponding conductor to said regulated voltage when the corresponding switch is in a first state and wherein each of said switches decouples the corresponding conductor from said regulated voltage when the corresponding switch is in a second state;

providing a plurality of termination networks, each one coupled to a corresponding one of said plurality of electrically controllable switches and having an impedance associated therewith;

coupling a first control signal to said control terminal of each of said plurality of electrically controllable switches for causing each of said electrically controllable switches to switch from said first state to said second state;

coupling a second control signal to said control terminal of each of said plurality of electrically controllable switches for causing each of said electrically controllable switches to switch from said second state to said first state; and coupling said first control signal to said voltage regulator, said first control signal causing said voltage regulator to cease providing said regulated voltage.

6. The method recited in claim 5 further comprising the step of clamping the voltage on each of the plurality of conductors.

7. The method recited in claim 5 wherein each of said plurality of termination networks comprises a resistor.

8. The method recited in claim 5 further comprising the step of adjusting said impedance associated with each one of said plurality of termination networks.

9. A controllable bus terminator having an impedance and providing a switchable termination on a bus having a plurality of conductors, said controllable bus terminator comprising:

a plurality of electrically controllable switches, each of said switches having first and second terminals adapted for coupling between a regulated voltage and a corresponding one of said plurality of conductors, wherein each of said switches couples the corresponding conductor to said regulated voltage when the corresponding switch is in a first state and wherein each of said switches decouples the corresponding conductor from said regulated voltage when the corresponding switch is in a second state, wherein each of said electrically controllable switches has a control terminal which is responsive to a first control signal for causing said switch to be in said first state and to a second control signal for causing said switch to be in said second state;

a plurality of termination networks, each one being adapted for coupling in series with a corresponding one of said plurality of electrically controllable switches, said regulated voltage, and a corresponding one of said plurality of conductors, wherein each of said electrically controllable switches couples the corresponding conductor to said regulated voltage through the corresponding termination network when said switch is in said first state; and a plurality of clamping circuits, each of said clamping circuits adapted for coupling to a corresponding one of said plurality of conductors.

10. The controllable bus terminator recited in claim 9 further comprising:

a voltage regulator providing said regulated voltage; and a control circuit comprising an output terminal coupled to each of said plurality of electrically controllable switches, said control circuit for providing a first control signal which causes each of said electrically controllable switches to switch from said first state to said second state and for providing a second control signal which causes each of said electrically controllable switches to switch from said second state to said first state, wherein said output terminal of said control circuit is coupled to said voltage regulator and wherein a first one of said first and second control signals turns on said voltage regulator and a second one of said first and second control signals turns off said voltage regulator.

11. The controllable bus terminator recited in claim 9 wherein each of said plurality of termination networks comprises a resistor.

12. A controllable bus terminator having an impedance and providing a switchable termination on a bus having a plurality of conductors, said controllable bus terminator comprising:

a voltage regulator;

a plurality of electrically controllable switches, each of said switches having first and second terminals adapted for coupling between a voltage regulator and a corresponding one of said plurality of conductors, wherein each of said switches couples the corresponding conductor to said voltage regulator when the corresponding switch is in a first state and wherein each of said switches decouples the corresponding conductor from said voltage when the corresponding switch is in a second state, wherein each of said electrically controllable switches has a control terminal which is responsive to a first control signal for causing said switch to be in said first state and to a second control signal for causing said switch to be in said second state;

a plurality of termination networks, each one being adapted for coupling in series with a corresponding one of said plurality of electrically controllable switches, said voltage regulator, and a corresponding one of said plurality of conductors, wherein each of said electrically controllable switches couples the corresponding conductor to said voltage regulator through the corresponding termination network when said switch is in said first state; and a control circuit comprising an output terminal coupled to said control terminal of each of said plurality of electrically controllable switches, said control circuit for providing a first control signal which causes each of said electrically controllable switches to switch from said first state to said second state and for providing a second control signal which causes each of said electrically controllable switches to switch from said second state to said first state, wherein said output terminal of said control circuit is coupled to said voltage regulator and wherein said second control signal turns on said voltage regulator and said first control signal turns off said voltage regulator.

13. The controllable bus terminator recited in claim 12 wherein each of said plurality of termination networks comprises a resistor.

\* \* \* \* \*